United States Patent [19]

Charton et al.

[11] Patent Number: 5,621,792
[45] Date of Patent: Apr. 15, 1997

[54] METHOD AND SYSTEM OF CONTROLLING THE MODE OF ACCESS TO SIGNALS, IN PARTICULAR PICTURE SIGNALS

[75] Inventors: Roger Charton; Alain Gelly, both of Paris, France

[73] Assignee: Telediffusion de France, Paris, France

[21] Appl. No.: 404,541

[22] Filed: Mar. 15, 1995

[30]   Foreign Application Priority Data

Jul. 20, 1993 [FR] France ................................. 93 08992

[51] Int. Cl.$^6$ ................................................ H04N 7/167
[52] U.S. Cl. ................................................ 380/7; 380/10
[58] Field of Search ................................ 380/7, 10, 6, 9, 380/14, 15, 17; H04N 7/167

[56]   References Cited

U.S. PATENT DOCUMENTS

| | | | |
|---|---|---|---|
| 4,024,575 | 5/1977 | Harney et al. | 380/7 |
| 4,450,481 | 5/1984 | Dickinson | 380/7 |
| 4,789,863 | 12/1988 | Bush | 340/825.35 |
| 4,792,971 | 12/1988 | Uemura | 380/7 |
| 4,912,760 | 3/1990 | West, Jr. et al. | 380/7 |
| 5,046,093 | 9/1991 | Wachob | 380/20 |
| 5,198,899 | 3/1993 | Cang | 348/7 |
| 5,199,067 | 3/1993 | Leduc et al. | 380/10 |
| 5,228,082 | 7/1993 | Yanagidaira et al. | |
| 5,341,424 | 8/1994 | Thatcher et al. | 380/7 |

FOREIGN PATENT DOCUMENTS

| | | | |
|---|---|---|---|
| 389339 | 9/1990 | European Pat. Off. | |
| 0432048A1 | 6/1991 | European Pat. Off. | H04N 7/167 |
| 0637172A1 | 2/1995 | European Pat. Off. | H04N 7/167 |

*Primary Examiner*—Thomas H. Tarcza
*Assistant Examiner*—Pinchus M. Laufer
*Attorney, Agent, or Firm*—Laubscher & Laubscher

[57]   ABSTRACT

The present invention concerns a method of controlling the mode of access to wanted signals, such as picture signals (IMAGE), whereby the user selects an access mode to a wanted signal remotely. A first access mode consists in supplying the user with the original wanted signal (IMAGE), and second access mode consists in transmitting to the user alternately and periodically the wanted signal and a jamming signal (MIRE, IT) into a jammed signal. This jammed signal remains intelligible so that the user can determine the content of the wanted signal and, if necessary, select the first access mode. The two access modes are billed differently. Hardware implementations of the method are described for switching grids of switching nodes in a centralized architecture, and for digital distribution networks with a more futuristic distributed type architecture.

10 Claims, 8 Drawing Sheets

(# METHOD AND SYSTEM OF CONTROLLING THE MODE OF ACCESS TO SIGNALS, IN PARTICULAR PICTURE SIGNALS

REFERENCE TO RELATED APPLICATIONS

This is a continuation of the International Application Ser. No. WO 95/03672, published Feb. 2, 1995, based on the PCT Application No. PCT/FR94/00894, filed Jul. 18, 1994, claiming priority of French Application No. 93-08992, filed Jul. 20, 1993.

BACKGROUND OF THE INVENTION

The present invention concerns in a general manner the field of distributing signals, such as picture or sound signals, to users and in particular controlling access to such signals.

BRIEF DESCRIPTION OF THE PRIOR ART

The prior art provides various signal access control techniques. A basic distinction is between the scrambling/unscrambling technique and the free-of-charge access limitation technique.

In the first of these techniques an unscrambler device is supplied to the user and a wanted signal such as a picture and/or sound signal is transmitted or broadcast after scrambling it to produce a scrambled signal (see U.S. Pat. No. 5,228,082, for example). Unscrambling the scrambled signal in the unscrambler device on the user's premises restores the wanted signal. This technique, frequently used by TV broadcasters, implies four main drawbacks. First of all, supplying users with unscrambling devices generates a high cost which is passed on to the users. Also, given that the original signal is supplied to the user in its entirety, even though it is in a scrambled form, it is technically feasible to produce an unscrambling device unknown to the broadcaster, leading to a loss of revenue for the latter. Further, the scrambling and unscrambling operations cause deterioration of the original wanted signal in the signal supplied to the user after the unscrambling operation. Finally, billing the user supplied with an unscrambling device for supply of the signal is on a fixed charge basis and does not necessary correspond to the actual time of use of the signal by the user; this could appear prohibitively costly to potential users and therefore represents an impediment to marketing of the service.

In the second technique, known as free of charge access limitation, the user controls supply of the signal remotely. The non-scrambled original signal is supplied in reply to this control for a predetermined short time period repeated a given number of times during a fixed time period. For example, the user might receive the original signal free of charge three times a day, each time for a five minute duration. These free-of-charge accesses to the original signal allow the user to find out the content of the signal, for example the picture in the case of a picture signal. If the user wishes to receive the original signal for a longer period, he remotely-controls the beginning of the reception of the signal, and subsequently, the end of this reception, and then he is billed according to how long the signal is received. This technique is more often used in installations of small size such as hotels and hospitals. It limits the number of times the user can access the content of the picture signal. In the case of a picture signal, this limitation prevents the user finding out the content of the picture at any random time, with the result that there is no incentive to select longer term reception of the picture signal given that, once the user has had access to the picture signal free of charge the given number of times no further signal is then supplied to the user free of charge during said fixed period.

SUMMARY OF THE INVENTION

A primary object of the present invention is to remedy by providing an access mode control method which differs from the second technique mentioned above in that it authorizes the user to access the picture signal at all times, not in its original form but rather in a jammed but nevertheless intelligible form, so that the user can find out at any time the total content of this signal.

Accordingly, a method of controlling a mode of access to a wanted signal by a user, comprising:

selective remote control by the user of plural access modes to the wanted signal, one of the access modes consisting in supply to the user of the wanted signal, is characterized in that another of the modes of access consists in the alternate and periodic supply to the user of the wanted signal and a jamming signal.

According to a preferred embodiment to which reference will be made in the following detailed description, the wanted signal is a picture signal. The jamming signal can be a test card signal or the result of a picture embedding, titling or superposition operation carried out on the picture signal.

According to another embodiment, the wanted signal is a sound signal and the jamming signal is a signal at a fixed audio frequency.

The invention also concerns a system for implementing the aforementioned method in switching grids for switching nodes intended for distributing picture signals to users, such as TV channel companies in a professional application, or homes connected to cable TV networks and customers in hotels in a consumer application.

A TV channel company typically remote controls a switching grid to set up a connection between one input and one output of the grid. The input of the grid constitutes an external picture input, for example, to which the one of picture signals read from a picture bank or a live report signal is applied. The grid output is connected to the TV channel control desk. An operator in the control desk can, subject to whatever access restrictions apply, select any one of the grid inputs to receive the corresponding picture at the control desk.

Current deregulation of picture distribution has introduced new carriers such as satellite TV and private TV companies. This deregulation has led to picture-requested professional clients such as TV channel companies to revise their policy with regard to the picture distributors, who are expected to provide ever more varied services.

In the prior art, various difficulties get in the way of this new requirement:

either each of the picture signals received at respective inputs of the switching grid is distributed to all users, (such as TV channel companies), which enables each user to select the one of the picture signals and decide to broadcast it to TV viewers, in which case there is neither confidentiality nor selectivity in respect of signal distribution;

or the picture signals are distributed to respective user groups in accordance with rights assigned by the switching grid operator, in which case confidentiality and selectivity are obtained in respect of the distribution of the signals, but users are offered only restricted access to the signals, which prevents users who are not entitled to receive certain signals from discovering the benefits of such signals and deciding to purchase them.

Another object of the invention is to provide a system for controlling a mode of access to a wanted signals, such as picture or sound signals, at the output of the switching grid under direct remote control of the user so that the user can select at all times, in accordance with the access modes he is entitled to use, either an unaltered wanted signal from the switching grid, for example in the situation where the user wishes to use this wanted signal, or a signal which alternates the unaltered wanted signal and another signal referred to herein as the jamming signal, for example in the situation where the user wants to find out what information the signal is conveying before deciding whether to use it in the longer term. If the information consists of pictures, the jamming signal can be a bar test card signal or the wanted picture signal in scrambled form.

A complementary object of the invention is to charge differently for transmission of information according to whether the information is intended for preliminary analysis, i.e. previewing of a picture or prelistening of a sound, for example, or for use, i.e. in accordance with the two modes of access to the information defined hereinabove.

Accordingly, according to the invention, a system for controlling a mode of access to a wanted signal via a switching grid comprising a matrix of switching crosspoints between plural matrix row inputs respectively receiving wanted signals and plural matrix column outputs supplying wanted signals, a single crosspoint being established at any one time in a matrix column between the output of said column and one input of the matrix, is characterized in that it comprises, associated with each grid output, switching means having a first input connected to said each grid output and a second input receiving a picture jamming signal, and an output to be connected to one input of the switching means, and control means controlling the switching means in order to connect selectively to said output of the switching means either said first input or, periodically and alternately, said first and second inputs.

For example, the jamming signal is a color test card signal, the company logo or any other predetermined picture signal.

Additionally, there may be provided a means associated with each grid output for combining the wanted signal supplied at said each grid output with a further signal, such as a title to be embedded, into a resultant signal. The switching means associated with said each grid output further comprises thus a third input receiving the resultant signal to be connected selectively to the output of the switching means under the control of the control means.

This system is particularly adapted for integration into a switching node in the form a local area network to which is connected a plurality of local and/or remote stations transmitting first messages each including a crosspoint address word detected by a grid control unit to establish a corresponding crosspoint. Second messages transmitted by the stations further each include a control word for mode of access to the wanted signal at the output of the grid connected to said crosspoint when the crosspoint is established, said control word of access mode being received by a coupling means to the local area network to be transmitted to the control means with the address of said output connected to said crosspoint.

According to a feature of the invention, each second message further includes a user identification word which is received by central supervisory means connected to the local area network to increment a respective charge meter in said central supervisory means, addressed by the user identification word, at an incrementing frequency dependent on said control word for access mode in said message.

The invention also provides for remote siting of the switching means and the control means on the user's premises. When the wanted signals are picture signals, the control means comprises synchronization extraction means connected to each grid output for detecting and extracting a synchronization signal in one of said picture signals in order to connect said first and second inputs to said output of the switching means selectively and alternately, conditioned by detection and absence of detection of said synchronization signal in the picture signal, according to whether the wanted picture signal is respectively absent or present at the input of the switching means.

The invention also concerns a system for implementing the method of the invention in a digital network for distributing wanted signals such as picture signals. Fiber optic digital picture distribution networks will in the future replace the centralized architecture for distributing pictures via a switching grid as used today. Accordingly, the system comprises a serial-parallel converter means for converting serialized-bit data words of an incoming digital wanted signal into parallel-bit data words of the wanted signal, first and second validation means for respectively validating said parallel-bit data words of the wanted signal and parallel data words of jamming signal into outgoing parallel-bit words, means for selectively activating either the first validation means, or the first validation means and said second validation means alternately and periodically, in response to a control signal for access mode from a user, and parallel-serial converter means for converting said outgoing parallel-bit words into serialized-bit words transmitted to the user. means for selectively activating either the first validation means, or the first validation means and said second validation means alternately and periodically, in response to a control signal for access mode from a user, and parallel-serial converter means for converting said outgoing parallel-bit words into serialized-bit words transmitted to the user.

BRIEF DESCRIPTION OF THE DRAWING

Other features and advantages of the present invention will be apparent more clearly from the reading of the following description of several prefered embodiments of the invention with reference to the corresponding accompanying drawings in which.

DETAILED DESCRIPTION

APPLICATION OF THE INVENTION TO A SWITCHING GRID

Figure 1:
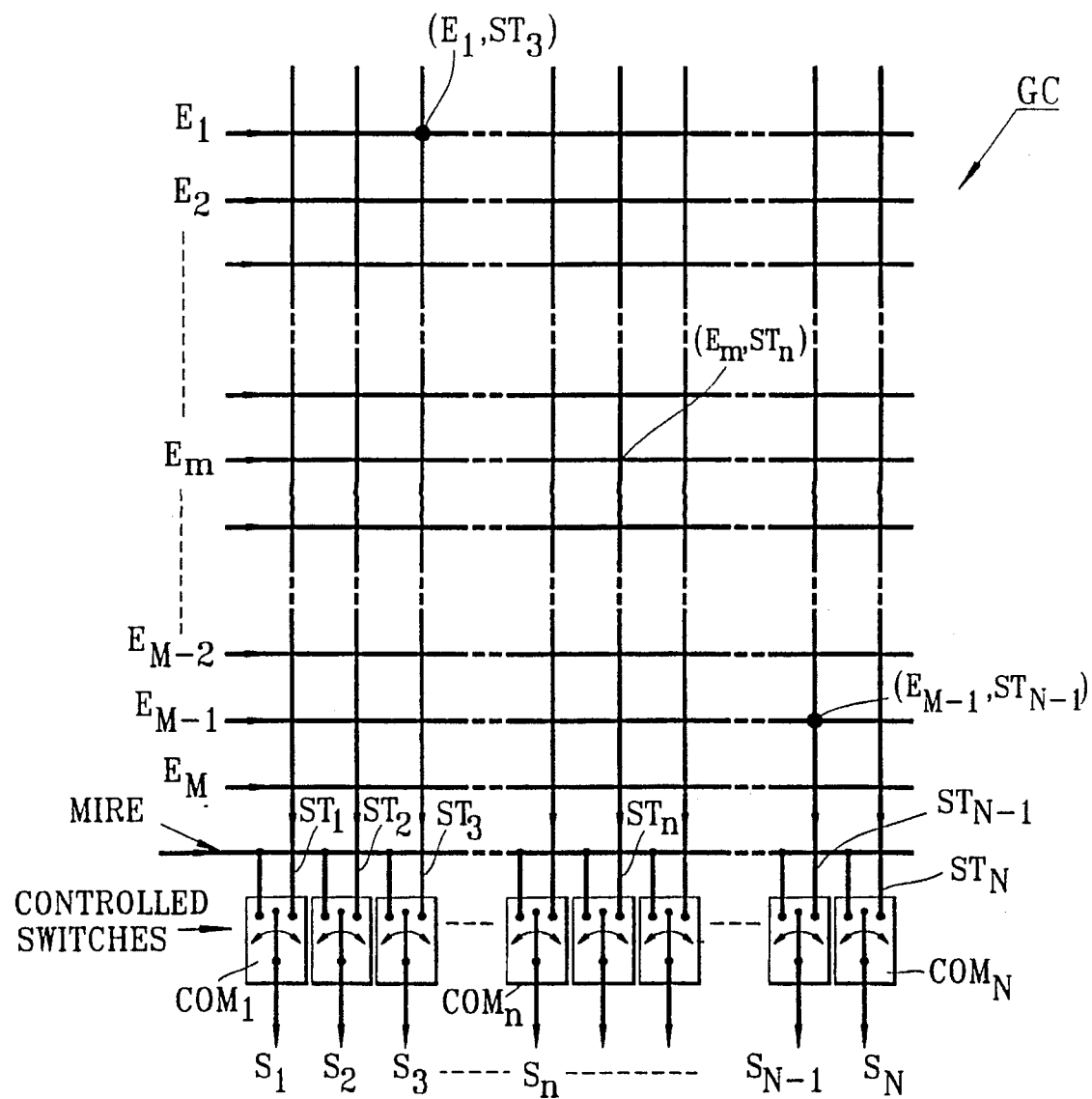
FIG. 1 is a schematic of a system in accordance with the invention for controlling the mode of access to a picture signal via a switching grid for a switching node of a TV center.

Referring to FIG. 1, a switching grid GC, also called a video switching matrix, in a TV center has M matrix row inputs $E_1$ through $E_M$ and N matrix column outputs $ST_1$ through $ST_N$, and therefore (M×N) switching crosspoints arranged in M rows and N columns.

In the following description it is assumed that all the signals applied to the grid inputs are TV picture signals and that the grid is adapted to switch analog signals (at video frequencies on the order of a few megahertz), or digital signals.

Using a space switching technique, the grid is implemented by placing side by side N M-input switching bars. A connection between an input $E_m$, m being between 1 and M, and an output $ST_n$, n lying between 1 and N, is established by turning on the crosspoint ($E_m$, $ST_n$) which in practise might be a gate-controlled field-effect transistor. This design of grid is distributive, i.e. any input can be switched to all the outputs; the grid is also non-blocking since it is always possible to connect any input to any output.

In the context of implementation of a switching grid GC in a TV nodal center or in a central picture distribution point such as a head of a cable TV network end or node of this network (EP-A-0 389 339, FIG. 1), or a TV program distribution head station in a hotel, the grid is controlled by a centralized system, by individual consoles, by a programmed system or by a hybrid system.

In the context of the invention, the switching grid GC is part of a switching node in a cable and/or broadcast video distribution network providing a picture distribution service to users such as TV Channel companies, homes connected to a cable TV network or guests in a hotel. A user controls the switching grid GC to establish a connection between a grid input connected, for example, to a live external picture source or to a video tape recorder in the case of distribution of prerecorded pictures, and an output typically connected to a local control desk or a remote control desk of a TV Channel company, a TV set in a home connected to a cable TV network or a hotel room. Subject to access restrictions (EP-A-0 389 339, col.4, 1.41 through col.5, 1.6 and col.7, 1.36 through col.8, 1.6), the user selects any one of the grid inputs to receive the corresponding pictures. After selecting pictures, the user can use these pictures.

In the prior art, switching node operators typically operate on behalf of users remote consoles from which the switching grid GC is remotely controlled.

Referring to the FIG. 1 schematic, to remedy the drawbacks according to the prior art the invention adds a switching stage comprising switches $COM_1$ through $COM_N$ at the output of the switching grid GC. Each switch $COM_n$, n being an integer between 1 and N, is represented diagrammatically as an electromechanical switch with two fixed input contacts and one mobile output contact, although in practise the switch is a transistorized analog circuit. The switch inputs are respectively connected to an output $ST_n$ of the grid GC and to a source of a picture jamming signal MIRE such as a test card of bars. Respective outputs $S_1$ through $S_N$ of the N switches $COM_1$ through $COM_N$ supply combined picture signals produced by operating the switches directly to the user's premises. The switch $COM_n$ is remote controlled by the user by means of a dedicated or non-dedicated terminal connected to a server, in a professional application, or a MINITEL (registered trademark) type non-dedicated videotex terminal in a home connected to the cable TV network or the internal telephone in a hotel room, in a consumer application. A user can have access to several switches.

A user served through to output $ST_n$ wishing to view pictures applied to input $E_m$ both selects the crosspoint ($E_m$, $ST_n$) in the grid to connect the terminals $E_m$ and $ST_n$ and operates the switch $COM_n$ corresponding to the output $ST_n$ of the grid GC. Users have two options for controlling the switch.

With a first option, the output $ST_n$ of the grid GC is connected to the output $S_n$ of the switch $COM_n$ of the switching stage so that the user receives the color TV picture signal incoming at input $E_m$ clearly, i.e. with no alternation with any jamming signal. This first option is chosen if the user wishes to view the pictures received at input $E_m$ clearly, for example.

With a second option, the switch $COM_n$ is operated in accordance with a predetermined mode of alternation so that the output $S_n$ transmits alternately the picture signal selected at the output $ST_n$ from the switching grid GC and the jamming signal MIRE.

The alternation may consist in transmission of one or more successive lines or frames of the picture signal incoming at $E_m$ followed by transmission of one or more successive lines or frames of the signal MIRE. The second option is chosen if the user wishes to preview a sequence of pictures, for example. Each picture in the sequence, or each group of successive pictures, cannot be used directly by the user since the picture is jammed by the jamming signal. The rate of alternation is chosen so that the pictures incoming at $E_M$ are recognizable but unusable, enabling the user to select the first option if required.

Two different billing modes are used in respect of these two options, a higher rate being applied to supply of a non-jammed picture to the user. In this way the user manages access and the consequential expenses for himself.

Figure 2:
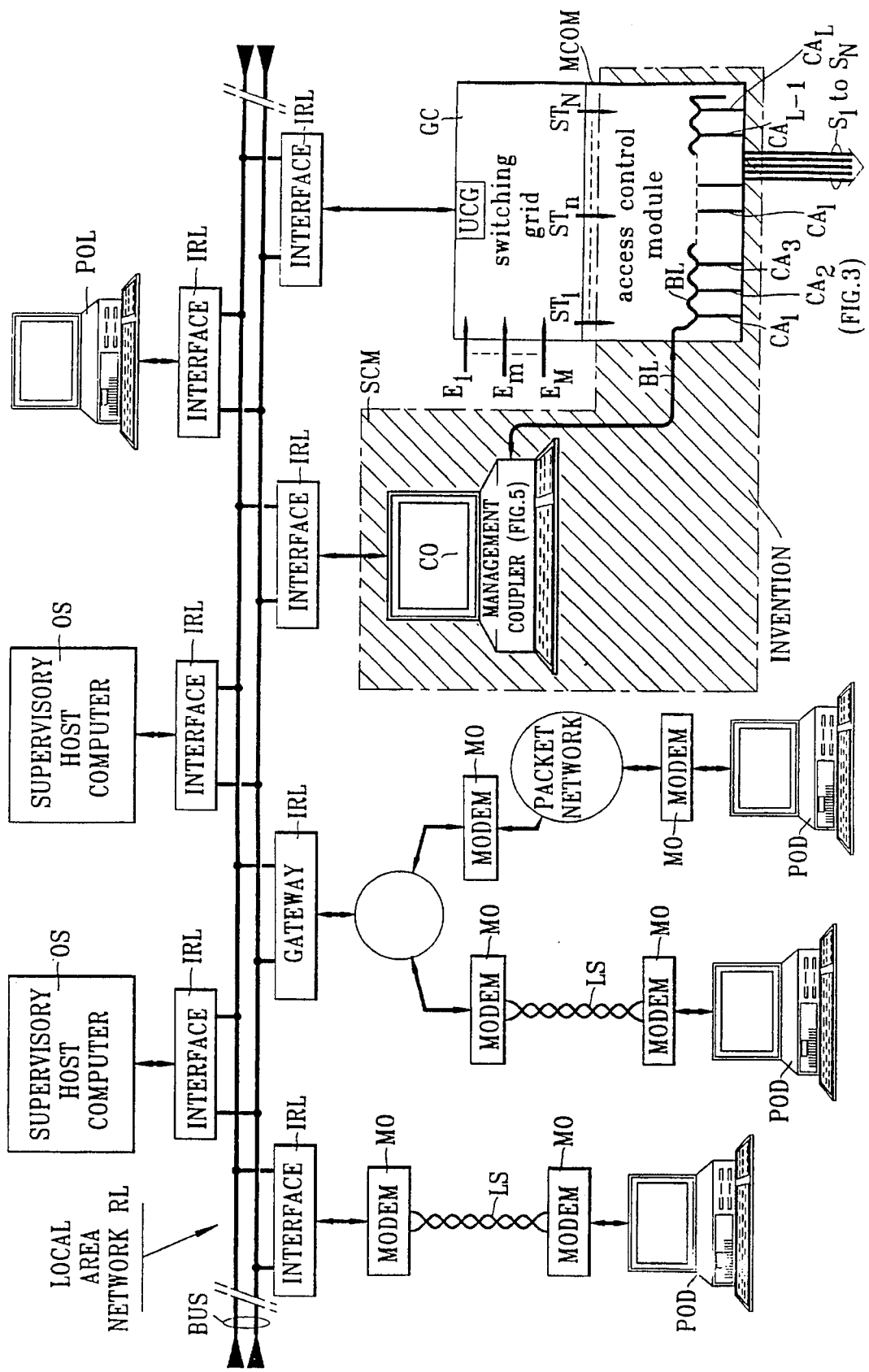
FIG. 2 is a schematic block diagram of a picture switching node including an access mode control system according to the invention.

Referring to FIG. 2, a picture switching node is typically in the form of a local area network RL comprising a bus BUS to which are connected the switching grid GC, local stations or consoles POL or remote stations or consoles POD, and supervisory host computers OS. The remote stations POD are connected to the bus BUS by a dedicated line DL or a packet switching network using modems MO, for example. The switching grid GC, local and remote stations POL and POD and supervisory host computers OS are connected to the bus BUS via respective local area network interfaces IRL. These interfaces IRL can be external or integrated physical interfaces for the local stations POL, for example, or gateways for the remote stations POD connected to the bus BUS via the packet switching network, for example. The various remote stations POD are allocated to the users which thus remote control the switching grid GC. The local stations POL are allocated to switching center operators. The switching grid GC receives crosspoint address words from the various local stations POL and remote stations POD via its own local area network interface.

These crosspoint address words are applied to a grid control unit UCG controlling the switching grid GC. The control unit UCG makes, i.e. turns on, or breaks, i.e. turns off, a crosspoint ($E_m$, $ST_n$) in the grid whose address (m, n) is contained in a received address word. In this way connections are made and broken between inputs of the grid GC receiving pictures and outputs of this same grid GC transmitting these pictures to users. The host computers OS supervise the local area network LAN and implement further functions such as restricting right of access to the switching grid GC by limitation of authorizations to make crosspoints.

Figure 5:
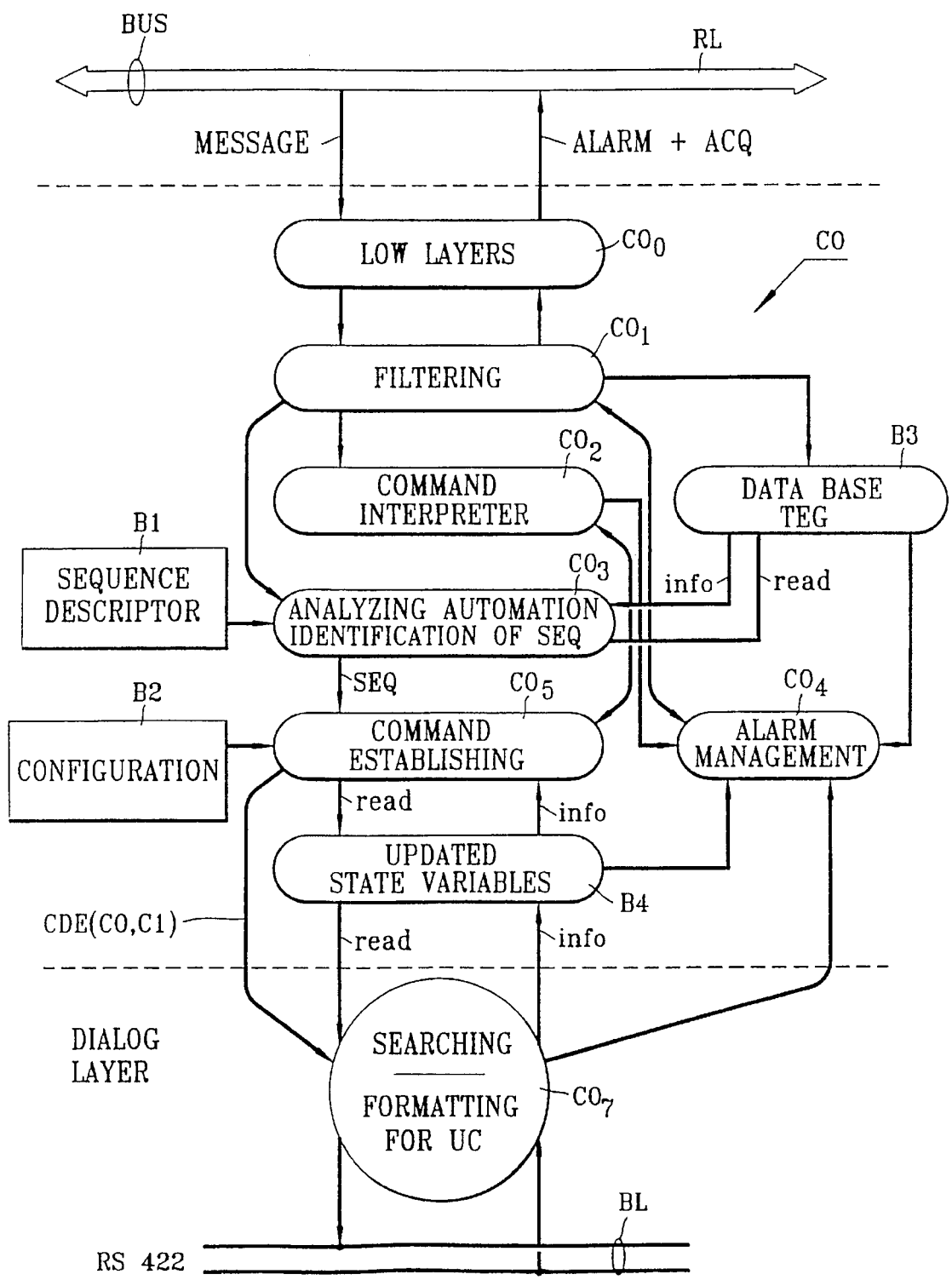
FIGS. 5 and 6 respectively show software architectures of a coupler on the one hand and a control unit on the circuit card from FIG. 3 on the other hand, both of which are part of the access mode control system according to the invention.

The access mode control system SCM of the invention shown in the shaded area in FIG. 2 is added to this known switching node general infrastructure. This access mode control system includes a management coupler CO and an access control module MCOM. The management coupler CO is connected to the bus BUS via a local area network interface IRL. This management coupler CO, detailed below with reference to FIG. 5, is intended for receiving access mode control words transmitted by the local and remote stations POL and POD, interpreting these access mode control words and controlling the access control module MCOM accordingly.

A crosspoint address word and an access mode control word are transmitted in respective first and second messages by the user's remote station POD. These first and second messages respectively contain first and second control fields respectively relating to control of the grid GC by the grid control unit UCG (grid control word=crosspoint address word) and control of the access control module MCOM (switching access mode control word). These first and second messages transmitted by the remote stations POD are respectively addressed to the grid control unit UCG and to the management coupler CO and supervisory host computer OS. These messages are received via local area network interfaces IRL. The first message is interpreted by the unit UCG to establish or break a crosspoint of the switching grid GC between a given input $E_m$ and an output $ST_n$ assigned to a given user. The second message is processed by the coupler CO for transmission to the access control module MCOM in order to select the mode of access to the picture signal produced at said output assigned to the user in response to establishing of the crosspoint that is chosen by the user via his station POD, the access mode being either a mode jammed by a test card or by an embedded picture, or a non-jammed mode, called clear mode. This second message is received in its entirety by at least one of said supervisory host computers OS which starts a charging meter associated with the user. To this end the second message also contains a user identification word field which identifies the user and which, after recognition by the computer, starts counting of clock pulses in the charge meter associated with that user. Depending on the chosen access mode represented by the access mode control word in the second message, either one of two clock signals having different periods is applied to the clock input of the counter if the counter is not programmable or a single clock signal is applied to the counter which is programmed with one of two rates of incrementation of this counter according to the access mode chosen by the user and read in the access mode control word included in the second message. The ratio between the periods of the two clock signals or between the two rates of incrementation lies between 10 and 50, for example.

To facilitate particularly maintenance of the access control module MCOM it comprises L electronic circuit cards $CA_1$ through $CA_L$. Each card $CA_l$, where l is an integer lying between 1 and L, processes four respective successive outputs $ST_n$ through $ST_{n+3}$ of the switching grid GC. Thus the number N of grid outputs is equal to 4L. The cards $CA_1$ through $CA_L$ are connected in cascade by a bus BL connected to the management coupler CC. Access mode control words in the second messages interpreted by the management coupler CO are transmitted to the cards $CA_1$ through $CA_L$. One of these cards, assigned to the output $ST_n$ of the switching grid GC for which establishing of a crosspoint ($E_m$, $ST_n$) selected from the crosspoints ($E_1$, $ST_n$) through ($E_M$, $ST_n$) has been requested, controls the access mode in accordance with the output address n included in the crosspoint address word. The outputs $S_1$ through $S_N$ of the various cards $CA_1$ through $CA_L$ therefore carry picture signals from the switching grid GC which have been processed by the access control module MCOM according to the jammed or non-jammed access modes chosen by the user.

One card $CA_1$ of the L electronic circuit cards of the access control module MCOM is now detailed with reference to FIG. 3. The description of the FIG. 1 schematic considered only jamming of the picture signal at input $E_m$ by a bar test card signal MIRE with alternation of one or more picture(s), for example. Other means of combining picture signals are used to render the incoming picture signal unusable by the user, i.e. such that it does not meet the criteria of picture clarity expected by the users. In a first embodiment, the picture signal combining means, also referred to as picture signal mixing means, are means for embedded a picture, called the foreground picture, into another picture, called the background picture, the latter being the picture signal to be jammed at the output $ST_n$; in this case, the foreground picture replaces one or more specific areas of the background picture and can be a title identifying the sequence of pictures to be jammed, for example, and/or a logo of the company working the switching node. In a still alternative embodiment, the picture signal combining means are means for superimposing a foreground picture, such as cross-hatching or a checkerboard test card, on all or part of a background picture to obtain a resultant full-screen picture or including a window in which the background picture is visible with a greater or lesser degree of fogging through the foreground picture. In further embodiments, picture embedding and overlaying means are combined to scramble areas of the background picture.

Figure 3:
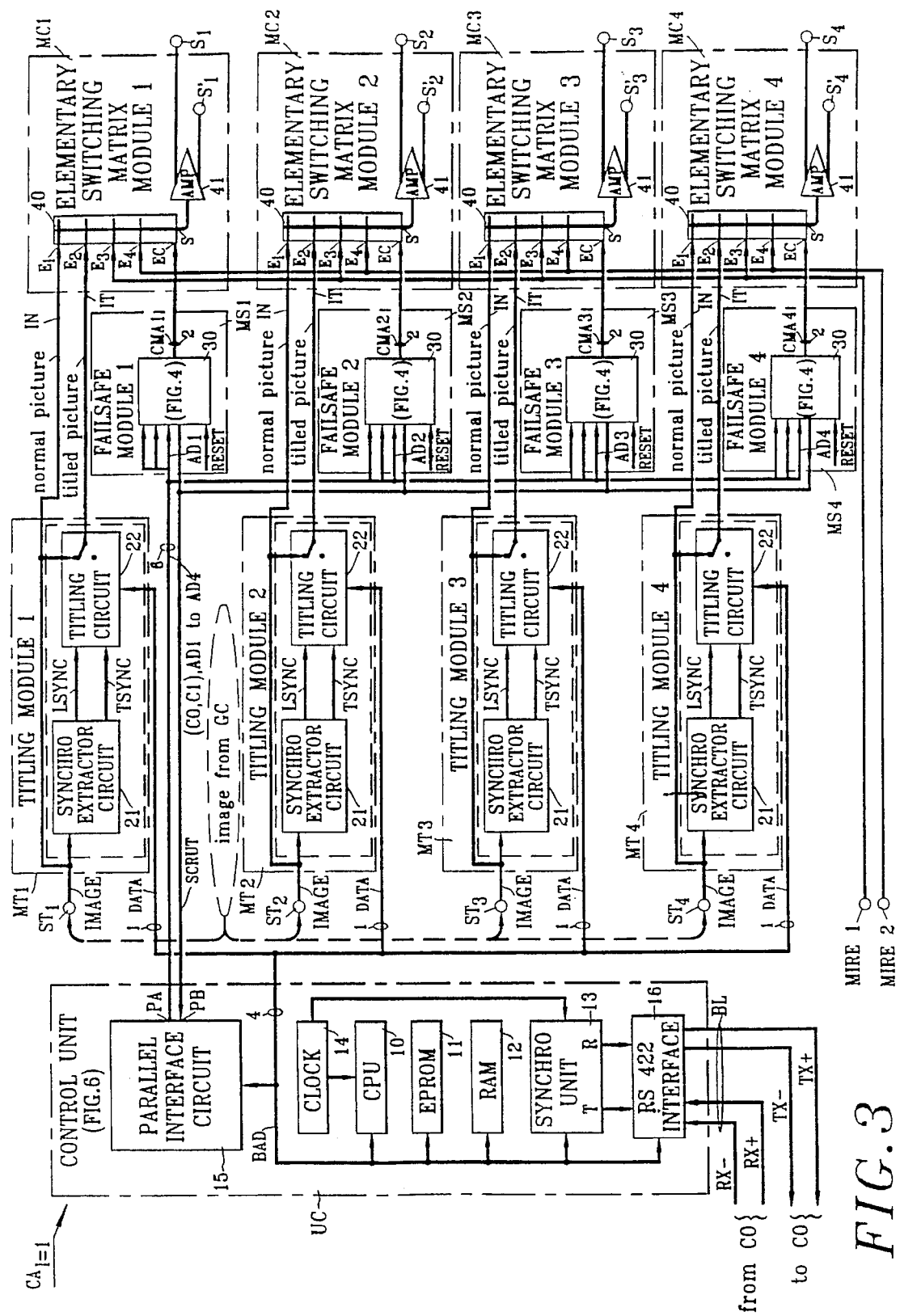
FIG. 3 is a detailed block diagram of a picture signal combining means group electronic circuit card included in the access mode control system shown in FIG. 2.

In FIG. 3, for example, the picture signal combining means comprise titling modules in addition to the combining means which switch between picture and test card signals.

A card $CA_1$ of the access mode control module MCOM is intended for processing four outputs $ST_n$ through $ST_{n+3}$ of the switching grid GC. It essentially comprises a control unit UC based on a microprocessor 10 and four titling modules $MT_1$ through $MT_4$, four failsafe modules $MS_1$ through MS4 and four analog or digital elementary switching matrices $MC_1$ through $MC_4$, all associated with four respective outputs $ST_n$ through $ST_{n+3}$ of the switching grid GC processed by the card $CA_1$. For reasons of simplicity, the card shown in FIG. 3 is the first card $CA_1$ of all the cards $CA_1$ through $CA_L$, and therefore receives and processes the signals at the first four outputs $ST_1$, $ST_2$, $ST_3$ and $ST_4$ of the switching grid GC.

The control unit UC whose software architecture is described subsequently with reference to FIG. 6, comprises the microprocessor 10, an EPROM read-only-memory 11 in which the software of the control unit UC is stored, a RAM random-access-memory 12 a synchronization unit 13, a clock 14, a parallel interface circuit 15 and an RS-422 type interface 16. The clock times the microprocessor 10 and the data synchronization unit 13 of the asynchronous type. The interface 16 is a physical interface between the connection bus BL and the control unit UC.

Each access mode control word received in a second message is transmitted by the coupler CO to the access control module MCOM for the purpose of selecting an access mode to the specific picture at the same time as the grid control unit UCG establishes a crosspoint in the grid GC. An output address n is included in the control word which is transmitted simultaneously to all the cards $CA_1$ through $CA_L$. In the control unit UC on each card this output address n is compared to a stored address word associated with the card. If the output address in the control word is identical to the stored address word, the control unit UC takes and interprets the access mode control word. Thus if the address n lies between 1 and 4, the card $CA_1$ interprets the access mode control word, if this address lies between 5 and 8 the card $CA_2$ processes the access mode control word, and so on according to an iteration, up to the card $CA_L$ for an address n lying between (L×4−3) and (L×4). Wires RX− and RX+ of the bus BL convey control words from the coupler CO to the cards $CA_l$ to which these control words are addressed in a first transmission direction in FIG. 3. Wires TX− and TX+ of the bus BL are assigned to a second transmission direction opposite to the first one thereby transmitting data from the control units UC on the cards CA1 to the coupler CO. This data is produced by the control units UC on the cards $CA_1$ in response to interrogations of the units UC from the coupler CO or is sent spontaneously by these units UC upon detecting a fault, in order to check that the cards CAl are operating correctly, as detailed subsequently with reference to FIGS. 4 and 5.

Although the card $CA_1$ contains four parallel processing channels for processing the picture signals at the respective outputs $ST_1$ through $ST_4$ of the switching grid GC, only the first processing channel comprising the titling module $MT_1$, the failsafe module $MT_1$ and the analog elementary switching matrix $MS_1$ is described here. In the other three channels processing the picture signals at the outputs $ST_2$ through $ST_4$ of the grid GC, the titling modules $MT_2$ through $MT_4$, failsafe modules $MS_2$ through $MS_4$ and switching matrices $MC_2$ through $MC_4$ are identical to their respective counterparts in the first channel.

The output $ST_1$ of the switching grid GC is connected to an input of the titling module $MT_1$. The latter includes a synchronization extractor circuit 21 and a preferably-programmable titling circuit 22. The synchronization extractor circuit 21 is based on a TDA 2595 or LM 1881 device, for example, and the titling circuit can be based on the FUJITSU MB 88303 device, for example.

A color TV picture signal IMAGE is present at the output $ST_1$ of the switching grid GC as soon as the user controls the establishing of a crosspoint ($E_m$, $ST_1$) of the grid. This signal IMAGE is applied to the input of the synchronization extractor circuit 21 which extracts a frame synchronization signal TSYNC and a line synchronization signal LSYNC from the picture signal IMAGE. The synchronization signals TSYNC and LSYNC are applied to respective inputs of the titling circuit 22 so that the latter can mark predetermined lines in each of the even and odd frames in the picture signal IMAGE, lines where a predetermined title is to be embedded. Two other inputs of the titling circuit 22 respectively receive a data signal DATA and the picture signal IMAGE. The data signal DATA corresponds to a predetermined text to be embedded in the picture signal IMAGE and the characters of this text and the character size are programmable in the titling circuit. The signal DATA, represented by ASCII characters, is transmitted by the microprocessor 10 to the titling circuit 22 via a data bus which is part of an address/data bus BAD connecting the microprocesor 10, the read-only-memory 11, the random-access-memory 12, the synchronization circuit 13 and the parallel interface circuit 15 in the control unit UC. As the data bus of the control unit UC is connected to all the titling circuits 22 in the modules $MT_1$ through $MT_4$, a decoding logic associated with respective buffer memories for the titling modules $MT_1$ through $MT_4$ is provided for transmitting a data signal DATA to only one titling circuit 22 in the titling module $MT_1$ through $MT_4$ which is connected to the output $ST_1$ through ST4 of the switching grid GC for which the user has commanded establishing of a crosspoint. To simplify FIG. 3 the decoding logic and the buffer memories are not shown.

An analog switch at the output of the titling circuit has two inputs to which are applied the signal IMAGE from the output $ST_1$, constituting a background picture signal, and a title video signal, constituting a foreground signal, produced by the circuit 22 in order to supply a combined picture resultant signal, also called as a titled picture signal IT. In the signal IT, the selected title is embedded in the pictures represented by the signal IMAGE. The switch comprises two amplifiers connected to a summer and having variable gains respectively controlled by complementary gain control signals generated by the titling circuit according to the contour of the title to be embedded, for example. The output of the switch of the circuit 22 is connected to an input of the elementary switching matrix 40 of the module $MC_1$.

The analog or digital elementary switching matrix 40 has four inputs $E_1$, $E_2$, $E_3$ and $E_4$ respectively receiving the picture signal IMAGE from the output $ST_1$ after the user establishes a crosspoint in the column of crosspoints of the switching grid GC associated with the output $ST_1$, the titled picture signal IT from the titling circuit 22, and two bar test card signals MIRE 1 and MIRE 2. Control inputs EC of the matrix 40 receive from the failsafe module $MT_1$ a two-bit matrix control word CMA1 to select at the output S of the matrix one of the four signals at the inputs $E_1$ through $E_4$.

The output S of the switching matrix 40 is connected to an input of an amplifier stage 41 having two outputs $S_1$ and $S'_1$ each of which transmits a resultant picture signal selected from four signals via the switching matrix 40 and corresponding to one of the picture access modes commanded by the corresponding user, or an unmodified picture, or a picture jammed by embedding a title or by switching with a test card.

The output $S'_1$ constitutes a test terminal of the access control module MCOM.

For controlling each of the four elementary switching matrices of the card $CA_1$ after reception of a second-message access mode control word by the microprocessor 10, the parallel interface circuit 15 in the control unit UC (FIG. 3) includes a register which serves an output port PA and into which the microprocessor 10 writes a six-bit address word via the address/data bus BAD. A first part of this address word, comprising two bits (CO, C1), constitutes an elementary matrix input address which is included in the access mode control word of a second message received by the microprocessor 10 and which is applied to the input of each of the four failsafe modules $MS_1$ through $MS_4$ by the parallel interface circuit 15. Four other bits, called address validation bits, AD1 through AD4 in the address word are a combination of three bits at the state "1" and a single bit at the state "0" and are respectively transmitted in the form of four logic signals by the circuit 15 over four respective wires to the respective memory inputs of the failsafe modules $MS_1$ through $MS_4$. Only the failsafe module $MS_1$ through $MS_4$ addressed by the address validation bit AD1 through AD4 which is at the state "0" stores the matrix input address (C0, C1) as a matrix control word CMA1 through CMA4 for selecting one of the inputs $E_1$ through $E_4$ of the associated elementary switching matrix 40.

It has to be noticed that there are various ways to control the switching matrix 40, depending on the picture access mode selected by the user. The control unit UC receives all picture access mode control words transmitted by the user via the bus BL after processing in the coupler CO.

If the user wishes to receive clearly the picture signal from output $ST_1$ of the switching grid GC, after receiving the access mode control word the microprocessor 10 loads the matrix input address word COM="00" into the register of the circuit 15 serving the output port PA in order to set to "0" the bit AD1 of this register which is associated with the failsafe module $MS_1$ and which validates the input address word (C0, C1)=CMA1="00" to control only the matrix 40 of the module $MC_1$ and to connect the input $E_1$ to the output S.

If the user merely wishes to "consult" the content of the picture signal IMAGE at the output $ST_1$ of the grid, the module validation address bit AD1 is still at "0" and validates an input address word (C0, C1)=CMA1="01" to select input I2 of the switching matrix $MC_1$ receiving the titled picture signal IT.

Finally, if the user wishes to "consult" the picture signal IMAGE at the output $ST_1$ of the grid in a form jammed by alternation with a bar test card signal MIRE 1 or MIRE 2, respectively with the titled picture signal IT, after receiving the access mode control word transmitted by the user and received via the bus BL the control unit UC switches alternately inputs $E_1$ and $E_3$ or $E_4$, respectively $E_1$ and $E_2$, of the switching matrix 40 respectively receiving the picture signal IMAGE and the signal MIRE 1 or MIRE 2, respectively the picture signal IMAGE and the titled picture signal IT. To this end, at a frequency determining the required jamming, the microprocessor 10 writes alternately into the register of the parallel interface circuit associated with the output port PA the input address words (C0, C1)="00" and (C0, C1)="10" or "11", respectively "00" and "01", to connect alternately input $E_1$ and input $E_3$ or E4, respectively input $E_1$ and input $E_2$, to the output S of the switching matrix 40. At the same time as the register of the circuit 15 is written in this way, the microprocessor 10 holds at "0" the module address bit AD1 associated with the failsafe module $MS_1$.

Figure 4:
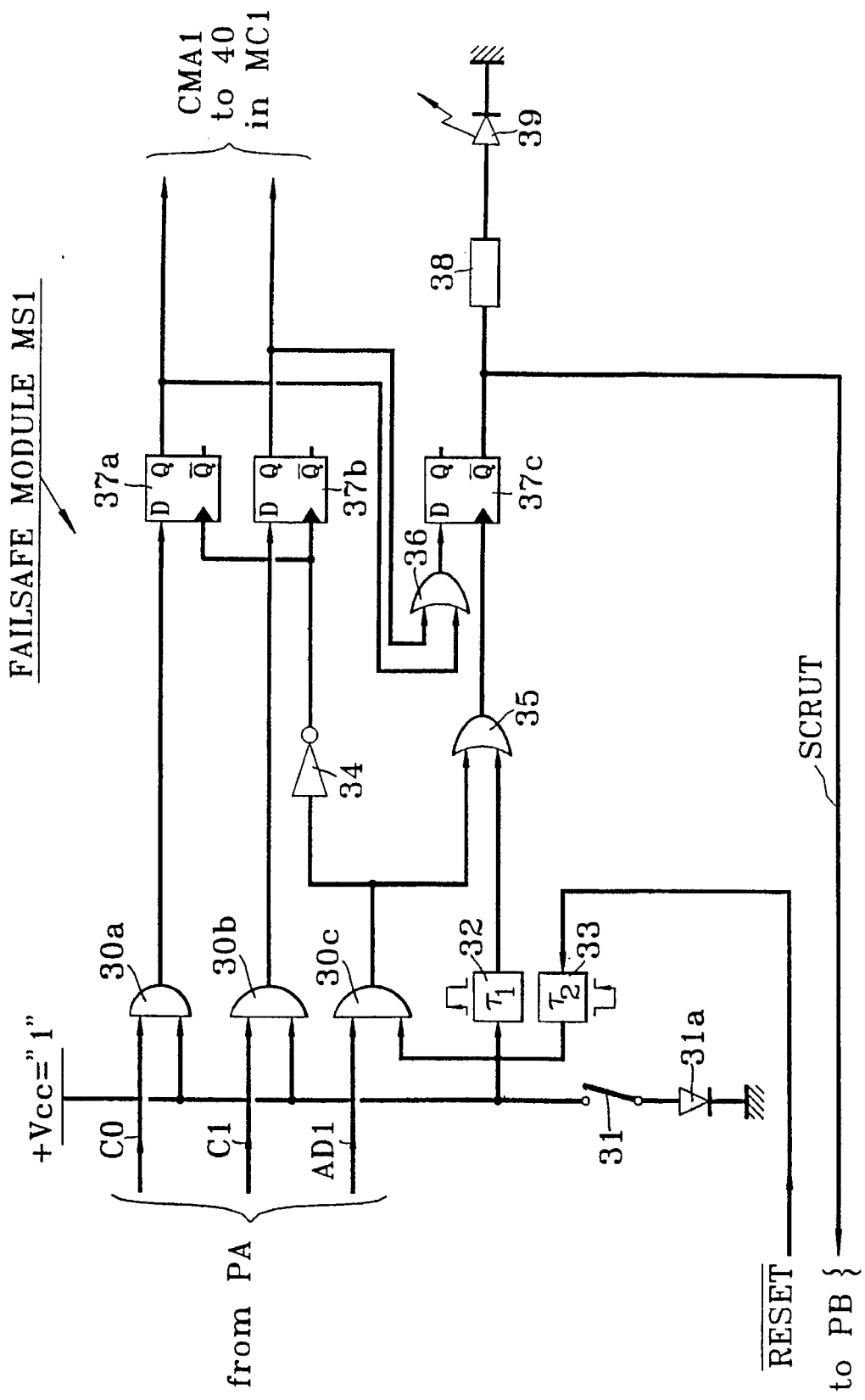
FIG. 4 is a detailed block diagram of a failsafe module on the circuit card from FIG. 3.

Referring to FIG. 4, the failsafe module $MT_1$ includes three two-input AND gates 30a, 30b and 30c, a failsafe switch 31, two monostables 32 and 33, an inverter 34, two two-input OR gates 35 and 36, three D type flip-flops 37a, 37b and 37c, a bias resistor 38 and an indicator lamp in the form of a light-emitting LED diode 39. Respective first inputs of the AND gates 30a and 30b receive the bits C0 and C1 constituting the matrix input address word. A first input of the AND gate 30c receives a respective one of the four address validation bits AD1 through AD4, in this instance bit AD1 for module $MS_1$. Second inputs of the AND gates are connected to a power supply terminal +Vcc at high logic state "1". The switch 31 and a forward-biased short-circuit protection diode 31a are connected in series between this power supply terminal and ground. The outputs of the AND gates 30a and 30b are applied to the data input D of respective flip-flops 37a and 37b whose clock input receives from the output of the gate 30c, via the inverter 34, the address validation signal AD1 on a respective one of the four module address wires respectively connected to the modules MS1 through MS4. The Q outputs of the flip-flops 37a and 37b are connected to the control inputs EC of the matrix 40 of the first processing channel.

When the card $CA_1$ is reset by pressing a pushbutton (not shown) the control unit UC produces a signal $\overline{RESET}$ which also resets the microprocessor 10. The monostable 33, triggerable by a falling edge, is triggered by the signal $\overline{RESET}$ applied to its input and offers a stable state at the high state "1". The output of the monostable 33 is connected to an input of the monostable 32 and to the power supply terminal +Vcc. The monostable 32, triggerable by a falling edge, offers a stable state at the low state "0" and has an output connected to a first input of the OR gate 35 whose second input receives the module address validation signal AD1 via the AND gate 30c. The output of the OR gate 35 is connected to a clock input of the D type flip-flop 37c. The data input D of this flip-flop 37c is connected to the output of the OR gate 36 whose inputs are connected to the Q outputs of the flip-flops 37a and 37b. The complemented output $\overline{Q}$ of the D type flip-flop 37c is connected to ground at M via the resistor 38 and the indicator LED diode 39 connected in cascade. The terminal common to the resistor 38 and the complemented output $\overline{Q}$ of the D type flip-flop 37c is fed back to one of four inputs of an interface port PB of the parallel interface circuit 15 respectively connected to the failsafe modules MS1 through MS4 of the card $CA_1$. This feedback enables the microprocessor 10 of the control unit UC to read periodically a register associated with the input port PB to verify that the last input address bits (C0, C1) transmitted by the unit UC to the failsafe module MS1 and stored in random access memory 12 actually correspond to the matrix control word CMA1 stored at the output of the D type flip-flops 37a and 37b and therefore that the switching matrix 40 is commanded correctly.

The failsafe module MS1 operates in the following manner. In normal operation of the circuits on the card $CA_1$ the switch 31 is in its open position which holds open the AND gates 30a, 30b and 30c whose second inputs are at the high state "1" or at the low state "0" (low). The two matrix input address bits C0 and C1 therefore pass through the open gates 30a and 30b to be stored at the output of the flip-flops 37a and 37b, into the matrix control word CMA1 in response to a falling edge of the module address validation signal AD1. After the bits C0 and C1 are stored, the rising edge of the signal AD1, via the OR gate 35, causes the state ($\overline{C0+C1}$) to be stored at the $\overline{Q}$ output of the flip-flop 37c. The state ($\overline{C0+C1}$) at the $\overline{Q}$ output of the flip-flop 37c is at "1" if and only if the switching matrix 40 is controlled to produce at the output S the clear picture signal IMAGE not jammed by a bar test card signal and not titled. This state ($\overline{C0+C1}$) at the output of the flip-flop 37c is forwarded in the form of a scanning signal SCRUT to the input port "PB" of the parallel interface circuit 15 so that the microprocessor 10 detects that the card $CA_1$ has failed if SCRUT is at "0" when the user has requested to receive a clear signal IMAGE.

When the card $CA_1$ is reset, the rest signal $\overline{RESET}$ from the microprocessor 10 is applied to the input of the monostable 33 which in response to the falling edge of the signal $\overline{RESET}$ produces a pulse at the low state "0" of duration τ2. This pulse closes the AND gates 30a, 30b and 30c. A "0" state results at the outputs of the two AND gates 30a and 30b. As the validation signal AD1 is at the high state "1", the low state "0" at the second input of the AND gate 30c for the period τ2 produces a reset pulse at the high state "1" of duration τ2 from the output of the inverter 34. The rising edge of this reset pulse validates, at the Q output of the D type flip-flops 37a and 37b, the outputs of the AND gates 30a and 30b in a matrix control word CMA1 assuming the value CMA1=("0", "0") selecting at the output of the switching matrix 40 the clear wanted picture signal IMAGE not jammed by the signal MIRE, not titled.

If the microprocessor 10 detects that the card $CA_1$ has failed, on the basis of the signal SCRUT as previously explained, the switch 31 is closed for example in response to the control from a switching node operator at a local state POL via the local area network RL, or by pressing a pushbutton (not shown) on the card $CA_1$. The second inputs of the AND gates 30a and 30b pass therefore to the low state "0" through the diode 31a. The output of the AND gate 30c previously at the state "1" is forced to the state "0". A pulse at the high state "1" is thus obtained at the output of the inverter 34. The rising edge of this pulse validates the "0" and "0" states at the respective outputs of the flip-flops 37a and 37b into the matrix control word CMA1, which selects input $E_1$ of the elementary switching matrix 40 to transmit the picture signal IMAGE via the output S of said matrix. Closing of the switch 31 following failure of the card $CA_1$ therefore guarantees the user an optimal mode of access to the picture not titled; the user has the benefit of optimal access to the picture provided that there is no incompatibility between the "0" and "0" states of the input address bits (C0, C1) and the "1" state of ($\overline{C0+C1}$) stored at the output of the flip-flop 37c and forwarded to the microprocessor 10 in the signal SCRUT. However, as soon as the state of ($\overline{C0+C1}$) is at "0", indicating non-optimal access to the picture not required by the user when C0 and C1 are both at "0" incrementing of the charge meter associated with the user is stopped.

On each reset or each time that failure is detected, the monostable 33 is used to produce a clock pulse applied to the clock inputs of the flip-flops 37a and 37b in order to store at the outputs of said flip-flops the "0" and "0" states for the matrix control word CMA1 in order to select a mode of access to the picture with no jamming and no titling.

The software architectures of the management coupler CO and the control unit UC will now be described in detail with reference to FIGS. 5 and 6, which are state diagrams.

FIG. 5 relates to the software architecture of the coupler CO.

The second control messages each including an access mode control word transmitted by a user are received via the bus BUS from the local area network RL by a LOW LAYER module $CO_0$ which manages the physical access layer to the bus BUS and the link layer relating to flow control and formatting of frames constituting control messages MESSAGE. Messages MESSAGE other than access mode messages are also received by the coupler CO, in particular for configuring it. A filtering module $CO_1$ classifies the messages according to their category: messages addressed to the coupler CO, or control messages addressed to the control module MCOM, or incorrect messages.

For an incorrect message, the filtering module $CO_1$ forwards it to an alarm management module $CO_4$ which generates an alarm message ALARM which is sent back to the user who sent the message MESSAGE to tell him that his message cannot be processed. When a message MESSAGE is addressed to the coupler CO, this message is forwarded from the filtering module to a control interpreter $CO_2$ in the coupler CO. The interpreter $CO_2$ translates the message into elementary controls which are forwarded to a control establishing module $CO_5$ which first reads a static configuration data base B2 relating to the declared hardware structure (chosen access modes, address on local bus, number of cards, text of titling module, etc) and a state variable data base relating to the availability of the cards declared in B2 and the switching matrices 40. A message addressed to the coupler is typically a message LEC requesting reading of a switching matrix input address word CMA stored in the state variable data base B4, for example. Remember that the microprocessor 10 of the card $CA_1$ periodically reads via the parallel interface circuit 15 the states constituting the matrix input address words CMA for the four processing channels on the card $CA_1$. These input address word states are stored in the data base B4 as state variables.

When a message is addressed to control the module MCOM, particularly to control a given picture access mode, this message is forwarded from the filtering module $CO1$ to an analyzing automation $CO_3$. The analyzer reads two data bases B1 and B3 respectively constituting a sequence descriptor and a grid state table TEG, firstly to identify the sequence SEQ required and secondly to verify in the table B3 updated in response to each received access control message that establishing of a crosspoint has been requested in the column of the grid connected to the output $ST_n$ corresponding to the commanded access mode.

The sequence SEQ required is passed to the control establishing module $CO_5$ which, via a formatting module $CO_7$, supplies a control frame CDE on the bus BL to the set of cards $CA_1$ through $CA_L$ of the control module MCOM. The control frame CDE also includes information representative of the matrix input address bits C0 and C1 for controlling a switching matrix 40, and the address of the card $CA_1$ to which the address bits accompanied by the address AD1 are addressed, i.e. in practise the address of the grid output $ST_n$.

Figure 6:
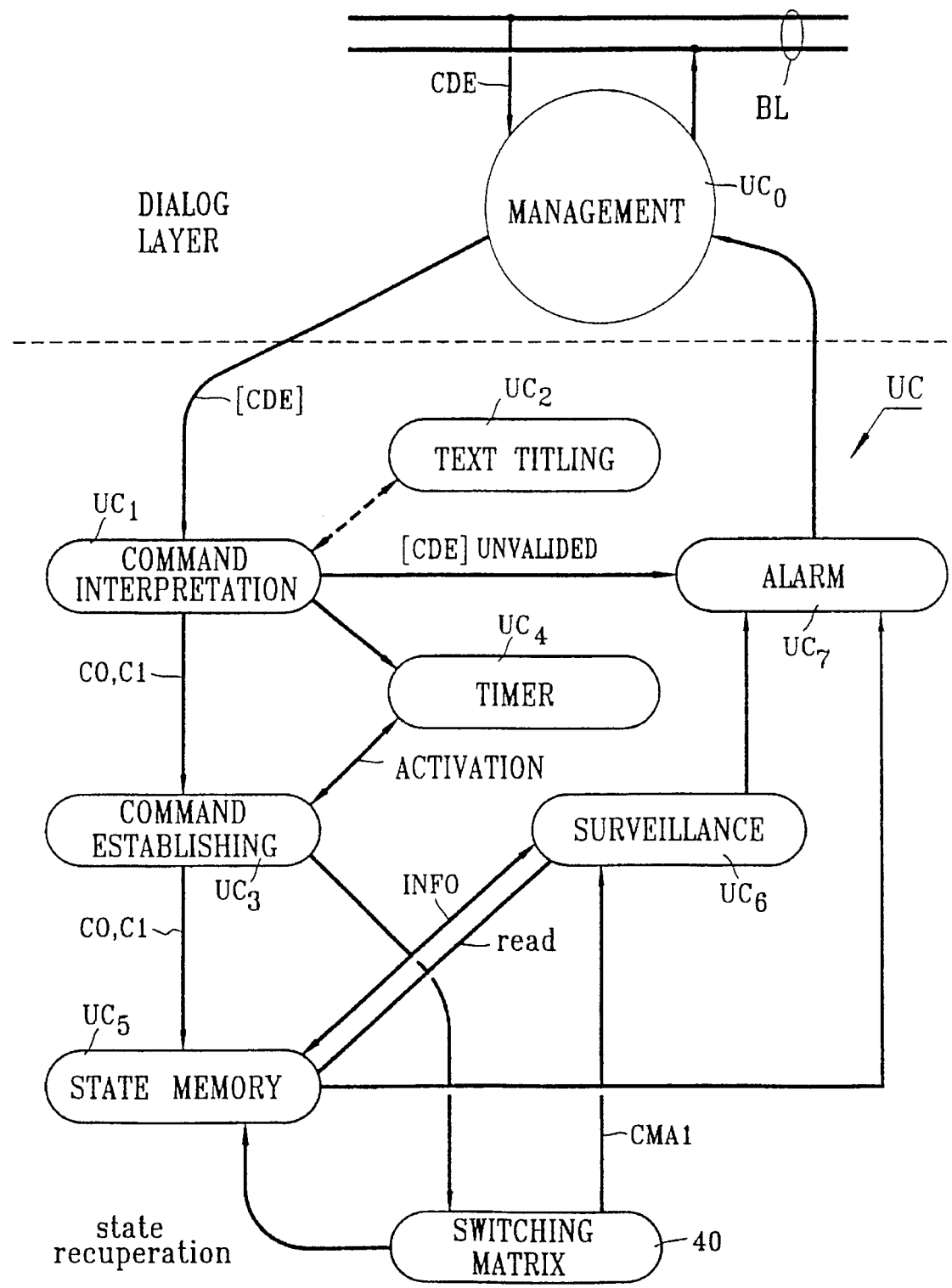

Referring to FIG. 6, the software architecture of a control unit UC on a card $CA_1$ is as follows.

A management module $UC_0$ selects from the control frames CDE transmitted on the bus BL those control frames CDE which are addressed to the card $CA_1$ on which the control unit UC is located. In the management module $UC_O$ each taken control frame is divested of information relating to the link layer concerning frame transport, such as the card address, to constitute a command [CDE]. This control [CDE] is applied to a control interpretation module $UC_1$. The latter activates a programmable timer module $UC_4$ which determines a switching period equal to the sum of a first duration T1 during which the output S of the matrix 40 is connected to the first input $E_1$ and a second duration T3 during which the output S is connected to one of the test card inputs $E_3$ and $E_4$, or $E_2$, when the user controls an access mode of the type jammed by alternation of the wanted picture signal IMAGE and one of the test card signals MIRE or the titled picture signal IT. The module $UC_1$ also looks for a specific custom text relating to at least partial marking of the picture by combination of pictures, such as titling of the picture in the titling module $MT_1$. If the control [CDE] cannot be interpreted, i.e. is incorrect, it is forwarded to an alarm module $UC_7$ which generates an alarm message which is sent to the coupler CO via the management module $UC_O$ which first pads it out to the length of a frame. The management module $UC_O$ manages continuous dialog with the coupler CO. If this dialog is interrupted and causes silence for more than a predetermined time period, the module $UC_O$ generates a control [CDE] transmitted to the module $UC_1$ and adapted to guarantee the user an optimal mode of access to the picture signal IMAGE not jammed, not titled alternately.

After activating the timer and text search functions, the control interpretation module $UC_1$ supplies a word made up of two address bits (C0, C1) to a control establishing module $UC_3$. This module $UC_3$ controls the switching matrix 40 to select one of the four inputs $E_1$ through $E_4$ of the matrix 40 to be connected to the output S. If the user chooses an access mode of the type jammed by a test card, the timer module $UC_4$ periodically activates the module $UC_3$ so that the latter controls the switching grid 40 by selecting alternately in each timing period the input $E_1$ during said first time T1 and then the other matrix input I3 or I4, respectively $E_1$ and $E_2$, during the second time T3. As already stated, the matrix is controlled by the parallel interface circuit 15, by loading the register associated with the corresponding processing panel and serving the output port PA of said circuit 15. At the same time as the module $UC_3$ controls the switching matrix 40, the corresponding two-bit word (C0, C1) is stored in a state memory table $UC_5$.

When the microprocessor 10 periodically reads the matrix control words CMA1 via the port PB of the interface circuit 15, the matrix control words CMA1 and the address words (C0, C1) stored in the table $UC_5$ are compared in a surveillance unit UC6 in order to detect any malfunctioning of the card $CA_1$. Referring again to FIG. 4, in the event of any such malfunctioning of the card the switch 31 is closed to guarantee the user an optimal mode of access to the picture.

The invention also applies to video signals other than color or black and white analog video signals of the SECAM, PAL or NTSC standard. The incoming signals IMAGE at the inputs of the switching grid can be R red, G green and B blue primary signals or MAC (multiplexed analog components) signals produced by compression and time-division multiplexing of analog luminance and chrominance components, or digital signals. In the case of MAC signals, the picture combining circuits such as the titling circuits are modified so that the titled signal is of the MAC type and the embedding of the title is effected in each of the predetermined lines of a picture frame in predetermined intervals of the compressed luminance signal and the compressed chrominance signal. In the case of digital signals, each channel for processing a picture signal IMAGE on the cards $CA_1$ through $CA_L$ is implemented exclusively in digital circuits if the incoming signals IMAGE are digital signals.

The application just described for use of the method of the invention in a switching grid is not limited to a picture signal. It can be expanded to encompass a wanted sound signal accompanying the picture signal, for example, in which case the picture and sound signals constitute an audiovisual program. The alternating jamming of the wanted sound signal, by analogy with the signal MIRE in the case of the picture signal, is then obtained by means of a sinusoidal signal at a fixed audio frequency, for example. The picture jamming signal and the fixed frequency jamming signal can be transmitted during the same half-cycle or respectively with the wanted sound signal during one half-cycle and with the wanted picture signal IMAGE during the other half-cycle.

In one embodiment of the method of the invention in a switching grid for analog TV signals, the main jamming function effected in the access control module MCOM is remotely implemented in an access control module installed on the user's premises. The user merely controls the making of a crosspoint in the switching grid.

Figure 7:
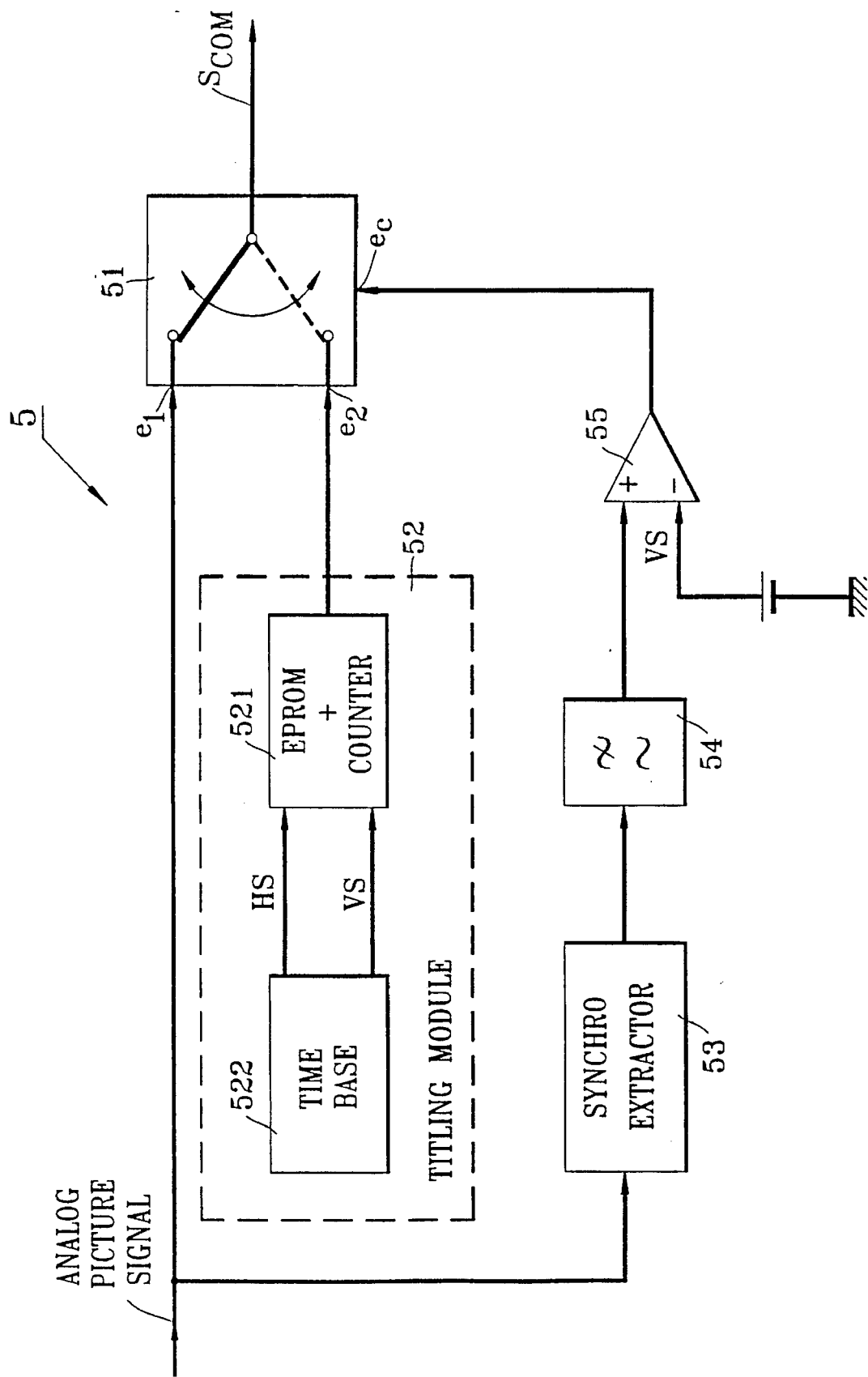
FIG. 7 is a block diagram of an access control module remotely sited at the user's premises.

According to this embodiment, whose preferred implementation is shown in FIG. 7, the access control module 5 mainly comprises switching device 51 whose first and second inputs e1 and e2 respectively receive a wanted picture signal in response to the establishing of a crosspoint and a titling signal supplied by a titling module 52 or any other picture jamming module. The module 52 comprises an EPROM programmable read-only-memory and counter circuit 521 scanned by line and frame synchronization signals HS and VS supplied by a time base 522 controlled by a quartz crystal oscillator. A line synchronization extractor circuit 53 in the access control module 55 extracts from the wanted picture signal a line synchronization signal which is applied via a low-pass filter 54 as a DC signal to a direct input of a comparator 55. The DC signal is compared to a predetermined voltage threshold VS in the comparator 55 which applies a logic signal to a control input $e_c$ of the switch device 51.

According to whether a synchronization signal is present or absent or according to whether the wanted signal is itself present or absent, by virtue of opening or closing of the crosspoint in the grid GC, which is received at the first input e1 of the switch device 51 and at the input of the extractor circuit 53, the switch device is controlled to connect the first input e1 or the second input e2 to its output $S_{COM}$. The output of the switch device 51 therefore supplies alternately the wanted picture signal and the titling signal if a crosspoint is established in the switching grid and a picture signal is received by the remote access control module. In practise the user terminates this alternation, which occurs by default, by sending an appropriate control to the server of the switching node which stabilizes the crosspoint in the grid GC, or which authorizes supply of the wanted signal with its synchronization signals, which instigates appropriate billing accordingly.

APPLICATION OF THE INVENTION TO DIGITAL DISTRIBUTION NETWORKS

The invention is not restricted to implementation of the method in a switching grid, but also encompasses its implementation in a fiber optic digital distribution network.

In an analogous way to the evolution of the telephone network, picture distribution, at least among professional users, is today effected in much the same way as speech signals were distributed in the old Public Switched Telephone Network in which the user had to make calls through an operator, i.e. in the present context the switching grid operator. Picture distribution will evolve in an analogous way to the telephone network since the main technical obstacles to such evolution will soon be removed by techniques for bit rate compression and data transmission at high bit rates on optical fibers. It is therefore realistic to expect in the near future the introduction of national digital transport networks, possibly switched networks, conveying picture signals between a national video library and users, for example, in an analogous way to that in which databases are currently accessible from terminals.

The centralized architecture of picture distribution via a switching grid will therefore be superseded by a distributed architecture in which the user will have autonomous access to the various services on offer.

In the context of these future picture distribution networks, the invention provides two different modes of access to a picture signal, namely a jammed access mode and an optimal or clear access mode. In the jammed access mode the wanted picture signal IMAGE is supplied alternately with a jamming picture signal. The user selects this mode of access to consult the content of the picture signal, for example to find out the subject matter of a film or a documentary. If the user then wishes to receive the picture signal clearly, not jammed by the jamming signal, he selects the optimal access mode.

Figure 8:
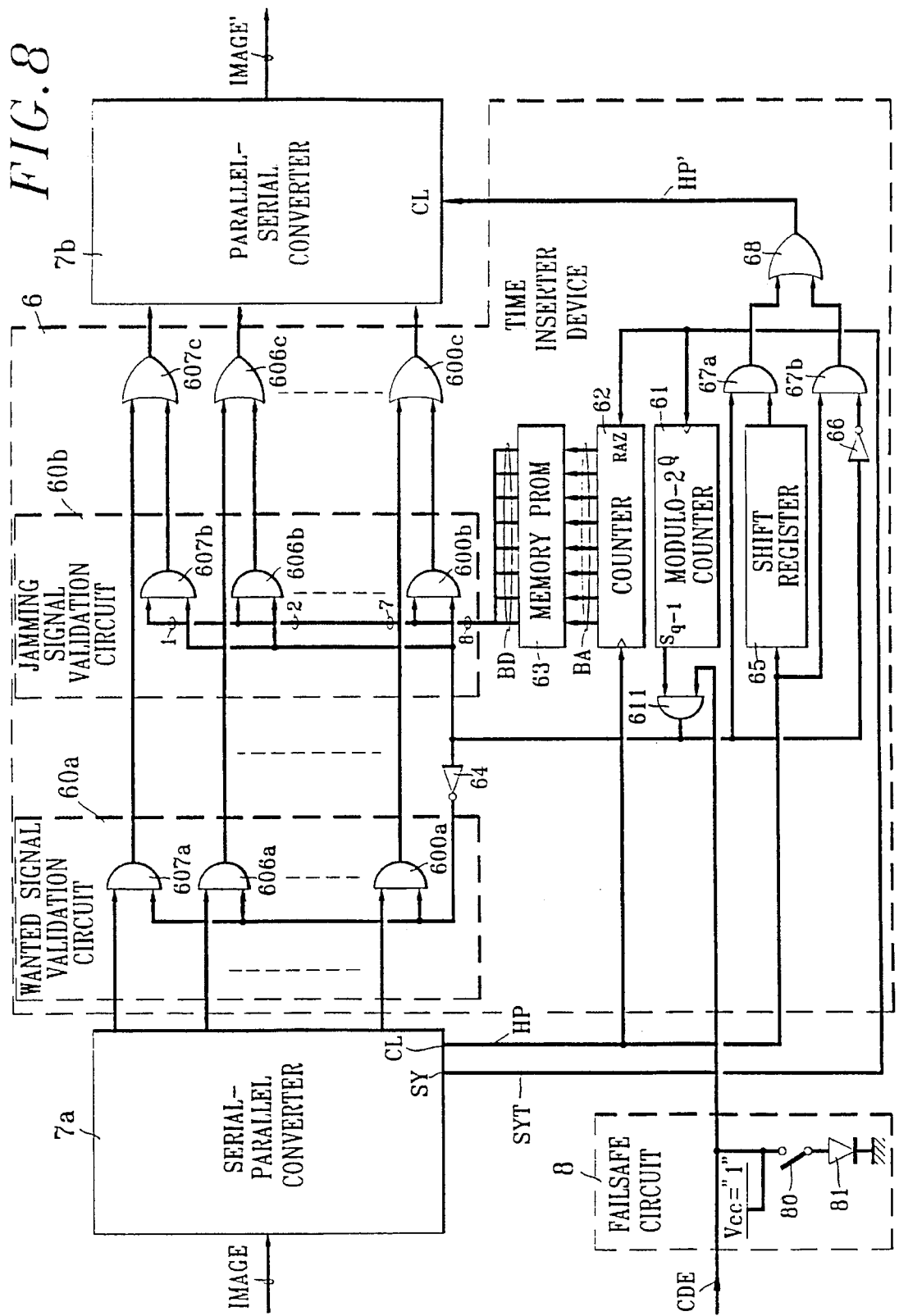
FIG. 8 is a block diagram of an access control system for implementing the invention in a digital picture distribution network.

FIG. 8 shows an access control system for implementation of the method of the invention in a digital picture distribution network.

The system includes a time inserter device 6, a serial-parallel converter 7a, a parallel-serial converter 7b and a security circuit 8. This system is inserted between a switching node (not shown) of the digital picture distribution network and the user, for example. It is assumed that the picture signal IMAGE produced at the output of the switching node is of the 4.2.2 type defined in Recommendation 601 of the C.C.I.R. (Comité Consultatif International des Radiocommunications) and comprises 625 lines per picture transmitted at the rate of 50 interleaved frames per second. This picture signal is made up of a sequence of multiplexed binary words each of ten bits relating either to the content of the picture or to line and frame synchronization and blanking time markers. Each of the words relating to the content of the picture comprises, firstly, an 8-bit word produced by sampling and quantizing on 256 levels a luminance signal at a frequency of 13.5 MHz or a chrominance signal of at a frequency of 6.75 MHz for each of the red and blue components and, secondly, two bits introduced for synchronization purposes for serial transmission of the picture signal. The line frequency is 15 625 Hz. Each digital picture line comprises 1 728 words of which 288 are for digital horizontal blanking and 1 440 are assigned to the active part. Of these 1 440 words, 720 luminance words alternate with 2×360 words of both chrominance components.

The serial-parallel converter 7a is based on the THOMSON SBX 1602 device, for example and receives the picture signal IMAGE in the form of serial 10-bit binary words. The serial-parallel converter further includes clock recovering means, decoding means and serial-to-parallel converting means to reproduce on eight parallel outputs at the same frequency as the 10-bit words of the incoming signal IMAGE, the parallel 8-bit words of the wanted signal which are respectively contained in the 10-bit words and from which have been removed the two bits introduced for synchronization purposes for serial transmission of the picture signal. The serial-parallel converter 7a also produces at respective clock outputs SY and CL a frame synchronization signal SYT in response to frame timing markers included in the first and last lines of even and odd frames, and a parallel clock signal HP synchronized to the parallel 8-bit words produced at the outputs of the serial-parallel converter 7a.

The eight bits of each parallel word produced at the respective outputs of the serial-parallel converter 7a are applied to respective inputs of eight two-input AND gates 600a through 607a in a wanted signal validation circuit 60a. The outputs of the AND gates 600a through 607a are applied to respective first inputs of eight two-input OR gates 600c through 607c. Second inputs of the eight OR gates 600c through 607c are connected to respective outputs of eight two-input AND gates 600b through 607b in a jamming signal validation circuit 60b.

First inputs of the AND gates 600b through 607b receive at the frequency of the parallel clock signal HP, 8 parallel bits of jamming signal words stored in a PROM memory 63 via the data bus BD from this memory 63. These parallel eight-bit jamming signal words are supplied by the memory 63 in a periodic sequence of (1 728×625/2) or (1 728×625) eight-bit words constituting one or two picture frames by means of a counter 62 whose outputs address said memory 63. The counter 62 is incremented by the parallel clock signal HP from the serial-parallel converter 7a and is reset to zero (RZ) by the frame synchronization signal SYT.

To supply to the user an access mode jammed by alternation of the wanted picture signal and the jamming signal, frames of picture signal words and frames of jamming signal words are multiplexed periodically at a frequency which is a multiple of the frame duration. For this purpose a modulo-$2^Q$ counter 61 is incremented by the frame synchronization signal SYT and has a qth output $S_{q-1}$ connected to a first input of a two-input AND gate 611, the value q being chosen arbitrarily between 1 and the integer Q which can be in the order of 3 to 8, for example. The output $S_{q-1}$ is alternately and periodically at the state "0" during $2^{q-1}$ is alternately and periodically at the state "0" during $2^{q-1}$ successive pulses of the frame synchronization signal SYT and at the high state "1" during $(2^Q-2^{q-1})$ subsequent successive pulses of the signal SYT.

The output of the AND gate 611 applies a validation signal via an inverter 64 to second inputs of the AND gates 600a through 607a and directly to respective second inputs of the AND gates 600b through 607b of the circuit 60b, respectively. When the AND gate 611 is open, the gates 600a through 607a and 600b through 607b are alternately open respectively during $(2^{q-1})$ successive pulses of the signal SYT and $(2^Q-2^{q-1})$ subsequent successive pulses of the signal SYT. On the outputs of the circuits 60a and 60b are therefore validate alternately and periodically sequences of parallel 8-bit words of the picture signal and of the jamming signal which are applied to eight parallel inputs of the serial-parallel converter 7b via the OR gates 600c through 607c.

The parallel-serial converter 7b is based on the THOMSON SX 1601 device, for example. It also includes clock recovering means, parallel-to-serial converting means and codering means and receives at two other parallel inputs (not shown) a signal at the low state "0" to form with the eight bits from the OR gates 600c through 607c ten-bit words. The coder means of the parallel-serial converter 5b modify the "0" state of the two bits applied to the other two parallel inputs to form a synchronization digit in the ten-bit words supplied serially at an output of the parallel-serial converter 7b.

An access mode control signal CDE supplied by the user is applied to a second input of the AND gate 611. When at high state "1", the signal CDE opens the gate 611 to offer at the output of the parallel-serial converter 7b a picture signal IMAGE' corresponding to the jammed access mode and resulting from alternation of the wanted picture signal IMAGE and the jamming signal. When at low state "0", for an optimal picture access mode, the signal CDE closes the gate 611 and the parallel-serial converter 7b supplies to the user a picture signal IMAGE' identical to the original picture signal IMAGE. The second input of the AND gate 611 is also connected to one terminal of a security circuit 8 including a supply voltage +Vcc at high state "1", a switch 80 and a protection diode 81 which are identical to and interconnected in exactly the same way as their counterparts Vcc, 31 and 31a in FIG. 4. The failsafe circuit 8 is used, by closing the switch 80, to force the state of the control signal CDE applied to the second input of the AND gate 611 to low state "0" when malfunctioning is detected, in order to guarantee the user an optimal picture access mode.

To align the internal parallel clocks of the serial-parallel converter 7a and the parallel-serial converter 7b, the output CL of the serial-parallel converter 7a applies the parallel clock signal HP to time-delay compensator means connected to a clock input CL of the parallel-serial converter 7b adapted to receive another parallel synchronization clock signal HP'.

Knowing that after a rising edge of the parallel clock signal HP produced by the serial-parallel converter 7a an 8-bit jamming signal word appears on the data bus BD of the PROM memory 63 only after a time-delay caused by reading the memory 63, the parallel clock signal HP produced by the serial-parallel converter 7a must be delayed into the parallel clock signal HP' applied to the parallel-serial converter 7b. This time-delay function is implemented by time-delay compensator means including a shift register 65, an inverter 66, two two-input AND gates 67a and 67b and a two-input OR gate 68. First inputs of the AND gates 67a and 67b receive the validation signal from the AND gate 611 directly and via the inverter 66, respectively. Second inputs of the gates 67a and 67b receive the signal HP via the register 65 and directly, respectively. The outputs of the two AND gates 67a and 67b are applied through the OR gate to the clock input CL of the parallel-serial converter 7b.

When the validation signal from the AND gate 611 is at the high state "1" to validate the parallel jamming signal words at the outputs of the AND gates 600b through 607b, the gate 67a is open, and the parallel synchronization clock signal HP is delayed by the register 65 by an amount equal to the time-delay due to reading a word in the memory 63.

When the validation signal from the AND gate 611 is at the low state "0" to validate the parallel wanted picture signal words at the outputs of the AND gates 600a through 607a, the gate 67b is open, and the parallel synchronization signal HP is reproduced unchanged in the signal HP' at the output of the OR gate 68.

What is claimed is:

1. A system for controlling a mode of access (SCM) to a wanted signal (IMAGE), comprising:

(a) a switching grid (GC) including a matrix of switching crosspoints, ($E_1$, $ST_1$–$E_M$, $ST_N$) between plural matrix row inputs ($E_1$ to $E_M$) respectively receiving wanted signals, and plural matrix column outputs ($ST_1$ to $ST_M$) supplying wanted signals (IMAGE), a single crosspoint being established at any one time in a matrix column between the output, ($ST_n$) of said column and one ($E_m$) of the inputs of the matrix;

(b) switching means ($COM_n$;40;$S_1$) associated with each grid output ($ST_n$) and having a first input ($E_1$;$e_1$) connected with said grid output ($ST_n$) and a second input ($E_3$,$E_4$;$e_2$) receiving a picture-jamming signal (MIRE 1), and an output (S;$S_{COM}$) adapted for connection with one input of said switching means; and (c) control means (UC:53,54,55) controlling said switching means to connect selectively said switching means output, (S;$S_{COM}$) either with said first input ($E_1$;$e_1$) or, periodically and alternatively, with said first and second inputs ($E_1$, $E_3$, $E_1$;$e_1$, $e_2$).

2. Apparatus as defined in claim 1, wherein said control means (UC) comprises programmable time-delay means ($UC_4$) for addressing and cyclically (T1+T3) connecting the first input ($E_1$) to the output (S) of said switching means (40) for a first predetermined period of time (T1), and for connecting the second input ($E_3$ or $E_4$) to the output (S) of the switching means (40) for a second predetermined period of time (T3).

3. Apparatus as defined in claim 1, and further including means ($Mt_n$) associated with said each grid output ($ST_n$) for combining the wanted signal (IMAGE) supplied by said each grid output with a further signal (TITRE) to yield a resultant signal (IT); and further wherein the switching means (40) associated with said each grid output further comprises a third input ($E_2$) receiving the resultant signal (IT) to be connected selectively to the output (S) of the switching means under the control of the control means (UC).

4. Apparatus as defined in claim 3, wherein said combining means includes one of the group consisting of a picture embedding means, a picture titling means ($MT_n$), and a picture superposition means.

5. Apparatus as defined in claim 3, wherein said wanted signals are picture signals (IMAGE); and further wherein said combining means comprises:

(a) means (21) for extracting frame and line synchronization signals (TSYNC, LSYNC) from the wanted picture signal (IMAGE) supplied by said each output ($ST_n$); and (b) picture embedding means (22) for embedding an additional picture (DATA) in the picture represented by said delivered picture signal (IMAGE) in synchronism with said frame and line synchronization signals (TSYNC, LSYNC).

6. Apparatus as defined in claim 16, and further including:

(d) validation means (30a, 30b) for validating each of input address words (CO,C1) transmitted by said control means (UC) to select one of the inputs ($E_1$ to $E_4$) of said switching means:

(e) storage means (37a, 37b) for storing said each of input address words (CO, C1) in a stored switching control word (CMAn) selecting one of the inputs of said switching means in response to an output address validation signal, ($AD_n$) transmitted by said control means (UC) and relating to said each output ($ST_n$); and (f) means (36, 37c) for taking one of the values (("0","0"), ("1", "0"), ("0","1") or ("1","1")) of the stored switching control word (CMAn);

(g) said control means (UC) comprising means for comparing said taken value with the input address word (CO,C1), so that if said compared value and s aid word are different, said control means deactivates said validation means (30_a, 30_b) and applies in said storage means a predetermined input address word ("0","0"; 37a, 37b) which is adapted to select said first input ($E_1$) of said switching means (40) to transmit said wanted signal (IMAGE) to said output (S) of the switching means (40).

7. Apparatus as defined in claim 6, wherein said validation means (30a,30b) includes AND gates having first inputs respectively receiving bits of the input address word (C0, C1), and second inputs connected to a terminal (+Vcc) at a high state ("1"), said terminal being grounded by means of a switch (31) to deactivate said validation means (30a,30b); and further wherein said storage means comprises flip-flop means (37a,37b) having data inputs (D) respectively connected to outputs of said AND gates, and clock inputs receiving said output address validation signal ($AD_n$).

8. Apparatus as defined in claim 1, and further wherein said switching grid is integrated into a switching node in the form a local area network (RL) to which is connected a plurality of stations (POL, POD) for transmitting first messages (MESSAGE) each including a crosspoint address word (m,n) detected by a grid control unit (UCG) to establish a corresponding crosspoint: and further wherein said stations (POL, POD) transmit second messages each including a control word for mode of access to the wanted signal outputting from the output ($ST_n$) of the glid (GC) connected to said crosspoint ($E_m$,$ST_n$) when said crosspoint is established, said control word for the access mode being received by a coupling means (CO) to the local area network (RL) to be transmitted to said control means (UC) with the address (n) of said output ($ST_n$) connected to said crosspoint ($E_m$, $ST_n$).

9. Apparatus as defined in claim 8, wherein each of said second messages further includes a user identification word which is received by a centralized supervisory means (OS) connected to said local area network (RL) to increment a respective charge meter in said central supervisory means (OS), addressed by said user identification word, at an incrementing frequency dependent on said control word for the access mode in each of said second messages.

10. Apparatus as defined in claim 1, wherein the wanted signals are picture signals and the control means (53,54,55) comprises synchronization extractor means (53) connected to said each grid output for detecting and extracting a syvnchronization signal in one of said picture signals in order to connect said first and second inputs (e1, e2) selectively to said output of the switching means (51) alternately, conditioned by detection and non-detection of said synchronization signal in the picture signal or conditioned by the presence or absence of the picture signal.

* * * * *